United States Patent [19]

Hasegawa et al.

[11] Patent Number: 4,948,213
[45] Date of Patent: Aug. 14, 1990

[54] BEAM SCANNER

[75] Inventors: Shin-ya Hasegawa, Atsugi; Fumio Yamagishi, Ebina; Hiroyuki Ikeda, Yokohama; Shigetake Iwata, Kawasaki, all of Japan

[73] Assignee: Fujitsu Limited, Kawasaki, Japan

[21] Appl. No.: 329,327

[22] Filed: Mar. 27, 1989

[30] Foreign Application Priority Data

Mar. 25, 1988 [JP] Japan ................................. 63-072633
Jan. 28, 1989 [JP] Japan ................................. 01-018559

[51] Int. Cl.⁵ ............................................. G02B 26/10
[52] U.S. Cl. .................................. 350/3.71; 350/3.83; 350/3.7
[58] Field of Search ......................... 350/3.7, 3.71, 3.83

[56] References Cited

U.S. PATENT DOCUMENTS 4,393,126  7/1983  Kojima et al. .
4,810,046  3/1989  Yamagishi et al. ................. 350/3.71
4,848,862  6/1989  Yamazaki et al. ................. 350/3.71

FOREIGN PATENT DOCUMENTS 56-161582  12/1981  Japan .
56-168620  12/1981  Japan .
60-194419  10/1985  Japan .
61-223704  10/1986  Japan .
62-28708    2/1987  Japan .
62-234118  10/1987  Japan .
62-240922  10/1987  Japan .

OTHER PUBLICATIONS

Applied Optics/vol. 22, No. 14/15, Jul. 1983 "Holographic Disk Scanners for Bow-Free Scanning".
Applied Optics/vol. 23, No. 12/15, Jun. 1984 "Flat-Field Linearized Scans with Reflection Dichromated Gelatin Holographic Gratings".
ICO-13 Conference Digest "Holographic Line Scanner Using Different Wavelength Method".

Primary Examiner—Bruce Y. Arnold
Assistant Examiner—Jay Ryan
Attorney, Agent, or Firm—Staas & Halsey

[57] ABSTRACT

A light beam scanning apparatus includes a rotatable holographic disk having a hologram which is constructed by an interference of a reference wave and an objective wave, which is a coma wave, the coma wave having a focal length which decreases toward the outer periphery from the inner periphery of the holographic disk in a radial direction. The focal length has a different direction perpendicular to the radial direction, so that when the hologram of the holographic disk which rotates is reconstructed by a reconstruction wave, the scanning is effected by the beams diffracted by the hologram.

11 Claims, 17 Drawing Sheets

SCANNING CENTER ─────────────→ SCANNING END
(0mm)　　　　　　(+63mm)　　　　　　(+126mm)

BEAM SCANNER

BACKGROUND OF THE INVENTION

1. Field of the Invention

The present invention relates to a beam scanner. More precisely, it relates to a high-precision laser beam straight line scanner having a holographic disk which scans a desired surface of a photoconductive drum.

In current beam scanners used to scan a photo-conductive drum in a laser printer with a laser beam, a conventional rotational polygon mirror, which is expensive and complex, has been replaced with a more easily manufactured, simpler and less expensive holographic disk. The beam scanner with a holographic disk realizes a "self-imaging" system without an auxiliary lens system, such as an f-$\theta$ lens, otherwise necessary to collect beams of light diffracted by the hologram of the holographic disk.

2. Description of the Related Art

The assignee of the present application proposed a holographic scanner as disclosed in Japanese Unexamined Patent Publication (Kokai) No. 60-194419, in which a hologram is constructed by an interference of an objective wave and a reference wave (both being divergent spherical waves) which are illuminated from symmetrical point light sources with respect to a plane (line) normal to a reconstruction point of the hologram at which the hologram is to be reconstructed. Thus, when a reconstruction beam is incident upon the reconstruction point, a diffraction beam having a diffraction angle identical to the incident angle is produced, to thereby increase the allowable tolerance of deviation of the position of a rotating shaft of the holographic disk and an inclination of the plane of the holographic disk with respect to a horizontal plane.

FIG. 16 shows a hologram scanner disclosed in the above-mentioned Japanese publication, in which a hologram of a holographic disk 4 is constructed by an interference of a reference wave (divergent spherical wave) $W_1$ and an objective wave (divergent spherical wave) $W_2$, which are emitted onto a reconstruction point P at which the hologram is to be generated from points (light sources) $A_1$ and $A_2$ located in a substantially symmetrical arrangement with respect to a line (or plane) X normal to the plane of the holographic disk 4. When the holographic disk 4 having the thus-constructed hologram is rotated about a rotating axis 0, and a reconstructing beam is incident upon the reconstruction point P, scanning beams are diffracted by the hologram in predetermined directions, so that the scanning beams are traversed along a predetermined line (note: according to the invention, this line is not always necessarily a straight line) on an imaging surface (focal plane) T of a photoconductive drum 5. Parameters for designing such a straight line scanner (holographic disk) are normal distances $f_{H1}$ and $f_{H2}$ of the light sources $A_1$ and $A_2$ from the plane of the holographic disk 4 ($f_{H1}=f_{H2}$), a wavelength $\lambda_1$ of the constructing waves $W_1$ and $W_2$, a disk radial distance (incident distance) R, a wavelength $\lambda_2$ of the reconstructing wave, and an incident angle $\theta_i$ of the reconstructing beam upon the holographic disk 4. The incident angle $\theta_i$ is given by the following equation:

$$\theta_i = \sin^{-1}\left[\frac{\lambda_2}{\lambda_1} \cdot \frac{R}{\sqrt{f_{H1}^2 + R^2}}\right] \quad (1)$$

The design of the holographic disk can be based on the above parameters. Among those parameters, in particular, the most significant parameter is a ratio $\lambda_2/\lambda_1$ of the wavelengths of the reconstructing beam and the constructing beams. Namely, a limitation is imposed on the kind of usable laser beams which must be fully coherent as a light source for constructing the hologram of the holographic disk. This inevitably leads to discrete characteristics of the hologram, as shown in FIG. 15. FIG. 15, shows the radial distance R (referred to hereinafter as an incident radius) and an imaging distance (focal length) l (FIG. 16) of an image from the reconstructing point P when a laser beam straight line holographic scanner is designed under the conditions that the wavelength $\lambda_2$ of the reconstructing wave is fixed at 780 nm, which is a wavelength of a diode laser, and the wavelength $\lambda_1$ of the constructing waves is one of 488 nm (Ar laser), 441.6 nm (He-Cd laser), and 325 nm (He-Cd laser), which are all commonly used to construct a holographic scanner. As can be seen from FIG. 15, to reduce the size of the holographic disk 4, i.e., to reduce the incident radius R while maintaining a constant local length l, the wavelength $\lambda_1$ of the constructing wave must be decreased. This is difficult in that a limitation of the wavelength exists. For example, assuming that a desired focal length l is 300 mm, if a laser beam having a wavelength of 291 nm, shown by a dotted and dashed line in FIG. 15, exists, the incident radius R can be decreased to approximately 28 mm, but a laser beam having a wavelength of less than 325 nm does not actually exist at present.

Furthermore, the decrease in the incident radius R invites an increase of the focal length l. This becomes particularly serious when a wider range of scanning is needed, i.e., when an increased width of scanning is needed, since it results in a reduced straightness of the locus and in an increased aberration of the scanning beam. As a result, the beam scanner can not be used for a high precision scanning, as in, for example, a laser printer.

SUMMARY OF THE INVENTION

The primary object of the present invention is to eliminate the above-mentioned drawbacks by providing a beam scanner with a small and high resolution holographic disk in which aberration of the scanning beam is greatly reduced and wherein the size of the holographic disk is reduced, an optical focal length is obtained without restriction by the wavelength of the constructing beams, and a high precision straight line scanning is performed.

Another object of the present invention is to provide a beam scanner with a small holographic disk by which a deviation or fluctuation of the scanning beam, and accordingly, of an image due to the inclination of the holographic disk with respect to the center of rotation of the holographic disk, is prevented.

To achieve the above object, according to one aspect of the present invention, there is provided a beam scanner including a rotatable holographic disk having a hologram constructed by an interference of a reference wave and an objective wave which is a coma wave, said coma wave having focal lengths which decrease from the inner periphery toward the outer periphery of the holographic disk in a radial direction, said focal lengths having different directions perpendicular to the radial direction, so that when the hologram of the rotating holographic disk is reconstructed by a reconstruction wave, the scanning is effected by the beams diffracted by the hologram.

Preferably, the objective wave is a coma wave produced when a non-aberration spherical wave incident upon a spherical optical element is axially offset.

The spherical optical element can be a convex lens, and preferably, the wavelength of the construction waves of the hologram is shorter than that of the reconstruction wave.

In a preferred embodiment, the reference wave is a divergent spherical wave having no aberration.

The reference wave is emitted from a point light source located opposite to a point light source of the objective wave with respect to an axis of the rotatable holographic disk.

According to another aspect of the present invention, both the reference wave and the objective wave are divergent spherical waves emitted from point light sources, wherein the reconstruction wave is incident upon the holographic disk at a reconstruction point at an incident angle $\theta_i$ which is given by the following equation:

$$R/l \cdot \cos^2 \theta_d = \cos \theta_i - \cos \theta_d$$

$$\sin \theta_i = S \cdot R / \sqrt{(F_1^2 + R^2)}$$

wherein

R is a distance between the axis of rotation of the holographic disk and the reconstruction point;

l is a focal length of the hologram;

$\theta_i$ is an incident angle of the reconstructing wave;

$\theta_d$ is an angle of diffraction of the reconstructing wave by the hologram;

S is a ratio between the wavelength ($\lambda_1$) of the constructing wave and the wavelength ($\lambda_2$) of the constructing wave ($S = \lambda_2/\lambda_1$);

$F_1$ is a normal distance between the point light source of the reference wave and the holographic disk.

Preferably, to perform a straight line scanning, a normal distance between the point light source of the objective wave and the holographic disk is given by the following equation:

$$F_2 = \sqrt{(S^2 - 1)Y_2(Y_2 - R)}$$

wherein $Y_2$ is a distance between the point light sources of the reference wave and the objective wave.

With this arrangement, the objective wave is a coma wave produced when a non-aberration divergent spherical wave incident upon the optical spherical element is axially offset, and accordingly, the incident radius R of the reconstruction beam can be reduced to provide a small holographic disk. The focal length is not subjected to the restriction of the wavelength of the constructing waves of the hologram of the holographic disk. Further, the aberration of the scanning beam can be remarkably decreased.

BRIEF DESCRIPTION OF THE DRAWINGS

The invention will be described below in detail with reference to the accompanying drawings, in which.

DESCRIPTION OF THE PREFERRED EMBODIMENTS

Figure 12:
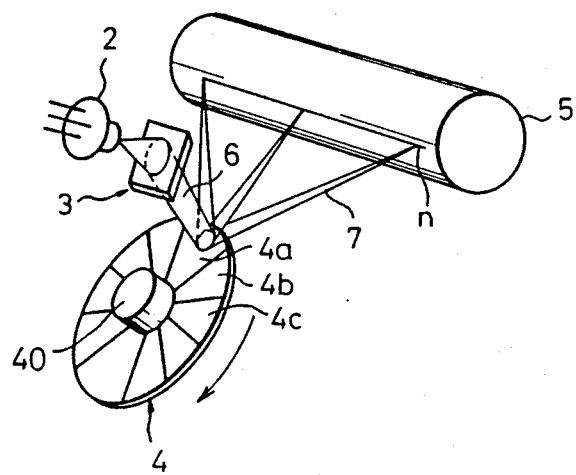
FIG. 12 is a schematic perspective view of an entire holographic beam scanner according to an embodiment of the present invention.

The basic concept of a beam straight line scanner will be explained below with reference to Japanese Unexamined Patent Publication (Kokai) No. 62-28708 corresponding to USSN 890,649, as shown in FIG. 12. The beam scanner shown in FIG. 12 includes a diode laser 2 as a light source, an aberration correcting holographic lens 3, and a holographic disk 4 having a plurality of hologram facets 4a, 4b, 4c, etc. The beam 6 of light incident upon the holographic disk 4 from one side thereof is diffracted by the hologram of the holographic disk 4, so that a photoconductive drum 5 is scanned straightly with the diffracted beams 7, in accordance with the rotation of the holographic disk 4; the holographic disk 4 has a rotating shaft 40 which rotates about an axis 0. The construction of the holographic disk 4, known per se, is based on the concept disclosed in the above-mentioned Japanese Unexamined Patent Publication No. 60-194419.

Figure 13:
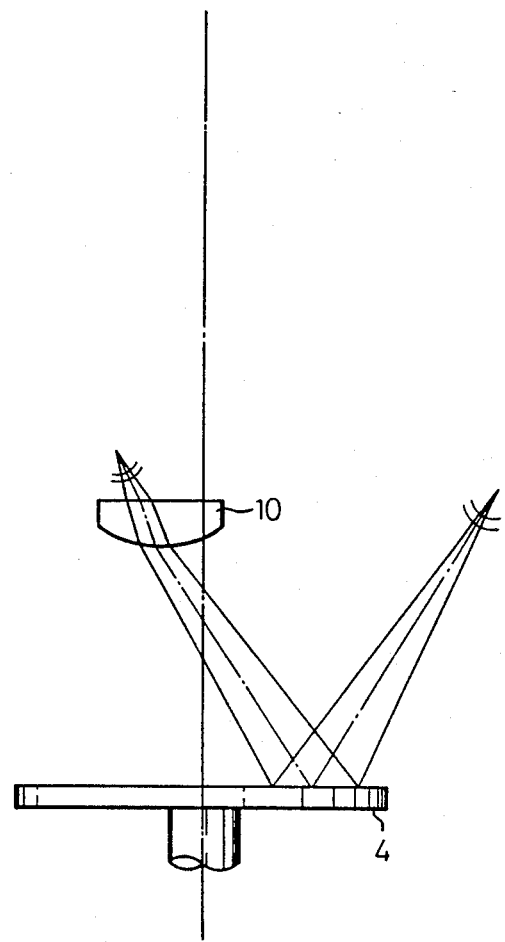
FIGS. 13 and 14 are schematic views showing how to construct a holographic disk according to two further modifications of the present invention.

The reduction of the size of the holographic disk 4, to thereby minimize the cost and size of the device as a whole, will be explained as follows. Assuming that the scanning width is 252 mm and the resolving power is 300 dpi, and accordingly, that the target of the scanning beam diameter is less than 100 μm, then in a conventional apparatus, a design value shown as * in FIG. 13 is needed (This design value is disclosed in Japanese Unexamined Patent Publication No. 62-23411 corresponding to USSN 890,649 to obtain the required scanning efficiency. Namely, the disk diameter must be at least 100 mm, in view of the diameter of the beam diffracted from the holographic disk 4. It is also assumed that the diameter of the holographic disk is 65 mm, which corresponds to a 50% reduction in a surface area ratio of the holographic disk, but the scanning efficiency is not decreased.

To this end, the reconstruction point P upon which the reconstructing beam is incident is assumed to be R = 28 mm, in view of a margin of the diameter of the reconstructing beam.

To provide a good straight line scanning and a satisfactory beam diameter at R=28 mm, the following phase transfer function $\psi_H(x, y)$ of the holographic disk 4 must be taken into consideration.

$$\psi_H(x, y) = k_1' \left\{ \sqrt{x^2 + (y + R)^2 + f_{H1}^2} - \sqrt{x^2 + (y - R)^2 + f_2^2} \right\} + \Sigma C_{i,j} x^i y^j \quad (2)$$

Figure 14:
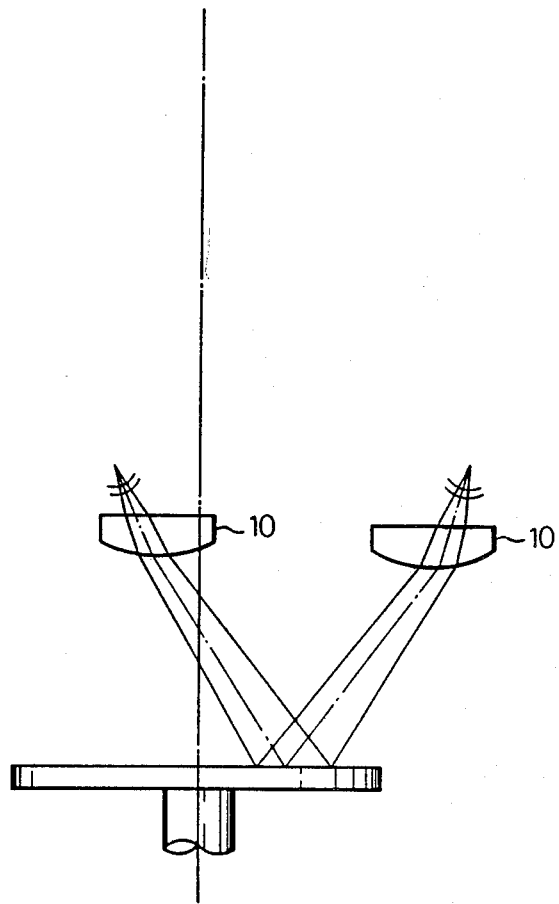

The first term in the equation (2) denotes straight line scanning, and $k_1'$ the wave number, i.e., $k_1' = \lambda_1'/2\pi$. The desired construction wavelength $\pi_1'$ is determined in FIG. 13 wherein $\pi_1' = 291$ nm. In FIG. 14, $f_{H1}$ and $f_{H2}$ are the desired focal lengths of the construction wave. The second term in equation (2) denotes the aberration correction, wherein $C_{ij}$ is unknown.

To obtain an optimum phase $\psi_H$, a method disclosed in a copending Japanese Unexamined Patent Publication No. 62-240922 is partly used. Namely, assuming that, in FIG. 12, the phase of the reconstructing beam incident upon the holographic disk 4 is $\psi_{in}(x, y)$, the phase of the scanning beam with no aberration at every scanning point n is $\psi_{out}(x, y)$, and the phase transfer function of the holographic disk that scans is $\psi_H{}^n(x, y)$, it is known from Japanese Unexamined Patent Publication No. 62-240922 that the least aberration of the scanning beam can be obtained when the following is satisfied:

$$\psi_{in}^{opt}(x, y) = \frac{\Sigma W_n \{\phi_{out}^{(n)}(x, y) - \phi_H{}^n(x, y)\}}{\Sigma W_n} \quad (3)$$

Figure 9:
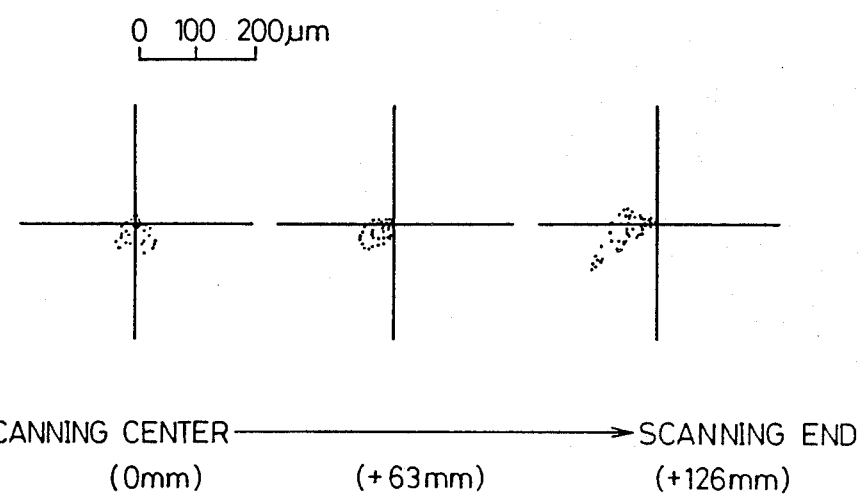
FIG. 9 is a schematic view of beam spots in an embodiment of the present invention.
Figure 10:
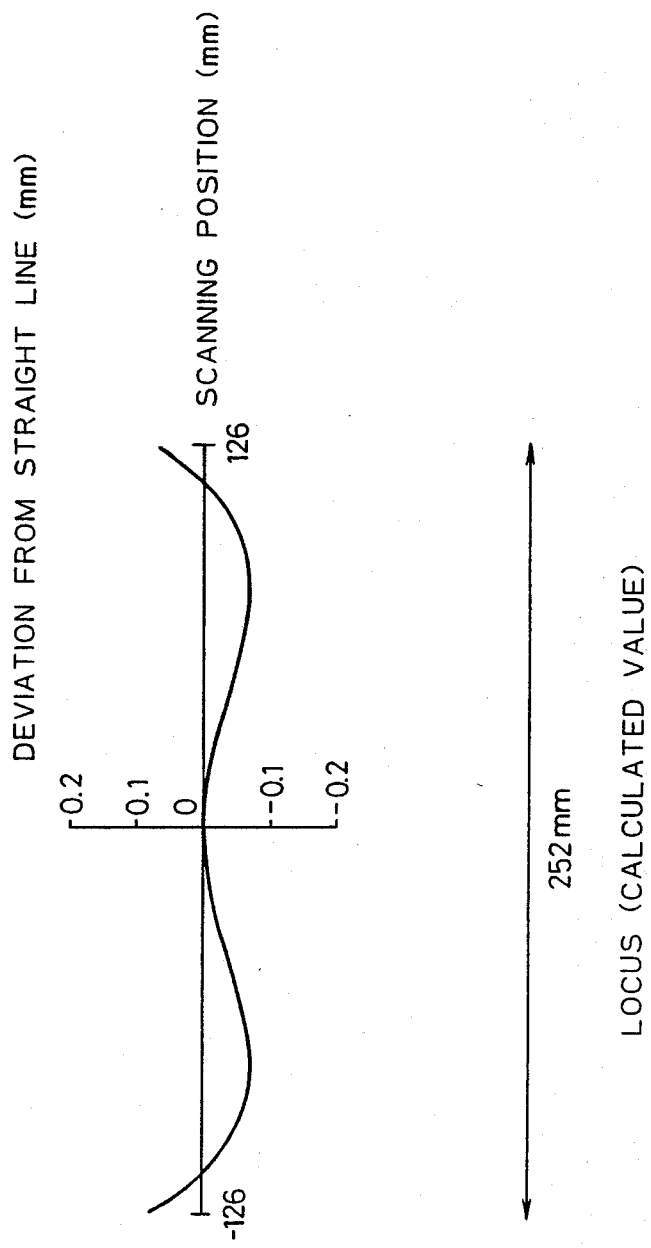
FIG. 10 is a diagram showing a locus (calculated value) of a scanning beam.

The optimum phase $\psi_{in}{}^{opt}(x, y)$ of the incident beam shown in equation (3) is a function of the phase transfer function $\psi_H(x, y)$ of the holographic disk 4, and $\{C_{i,j}\}$ of the phase transfer function of the holographic disk 4 in the equation (2) is optimized to uniformly minimize the diameter of the beam when the $\psi_{in}{}^{opt}(x, y)$ is incident upon the holographic disk 4. It has been found, by the damped least square method, that the locus as shown in FIG. 10 in which the deviation from a straight line is within ±0.1 mm throughout 252 mm, and the spot diagram of the scanning beam from the scanning center to the scanning end as shown in FIG. 9 were obtained. The wavelength $\lambda_2$ of the reconstructing beam was 780 nm, which is a wavelength of the diode laser, and the focal length was 276 nm. The incident angle $\theta_i$ upon the holographic disk 4 was 42.616° and the diffraction angle $\theta_d$ at the scanning center was 47.774°. The phase transfer function of the holographic disk 4 $\psi_H(x, y)$ is a complex function including an aspheric term. The reason for the slight difference between $\theta_i$ and $\theta_d$ will be mentioned later.

The above proves that a necessary phase transfer function $\psi_H(x, y)$ exists, and the following description is of a concrete method of constructing a hologram by using a holographic exposure.

Figure 1:
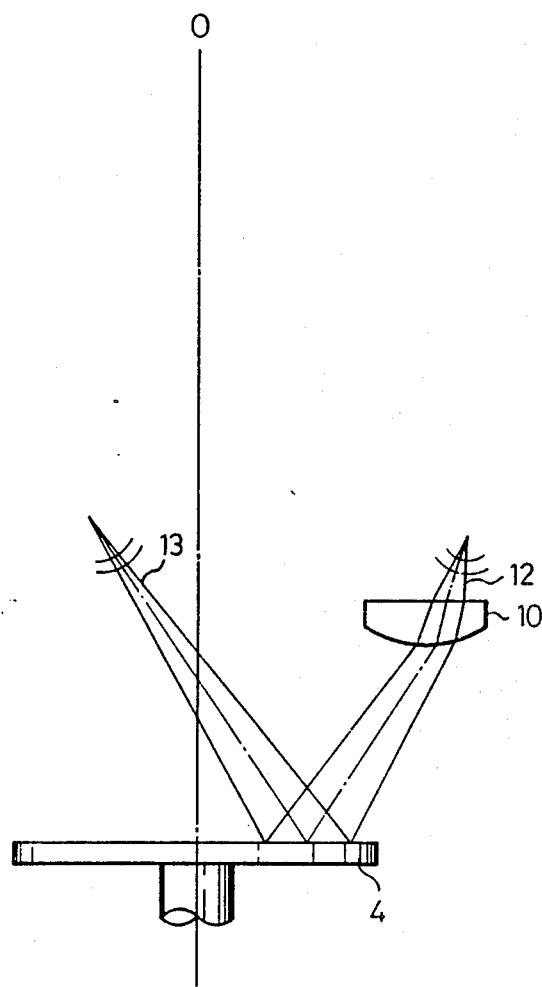
FIG. 1 is an explanatory view showing the manner of constructing a holographic disk, according to one aspect of the present invention.
Figure 8:
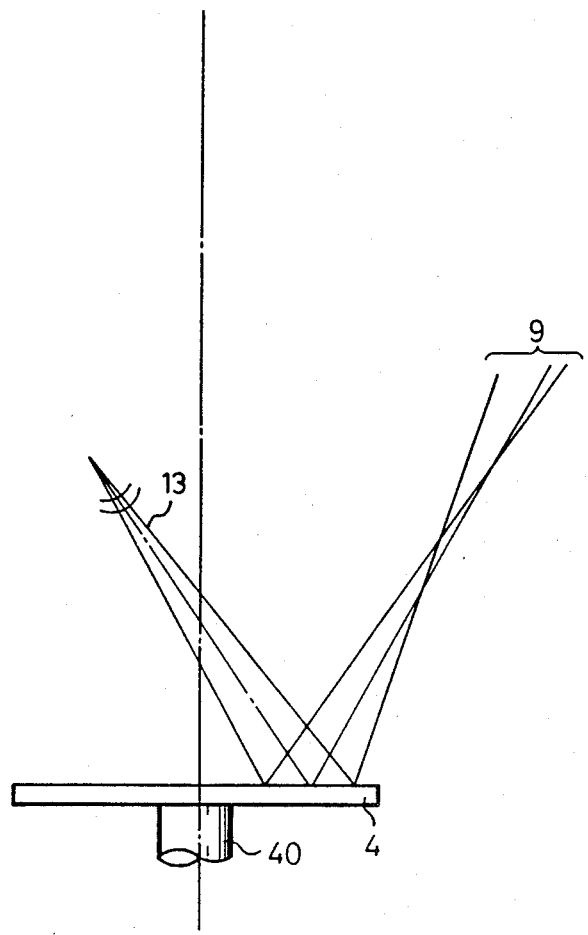
FIG. 8 is an explanatory view showing the manner of constructing a holographic disk.

In FIG. 8, it is assumed that a holographic disk 4 having the necessary phase transfer function $\psi_H(x, y)$ is constructed with beams having a wavelength $\lambda_1 = 325$ nm (corresponding to the wavelength of He-Cd laser) in spite of desired construction wavelength $\lambda_1'$, 291 nm. It has been found by ray-tracing that, if the reference wave for the holographic disk having the necessary phase transfer function $\psi_H(x, y)$ recorded thereon is a divergent spherical wave (no aberration), the objective wave must be a complex coma wave 9 as shown in FIG. 8. It also has been found that a coma wave produced when a divergent spherical wave 12 with no aberration incident upon a spherical optical element 10 is axially offset, as shown in FIG. 1, has the same characteristics (tendency) as that of the coma wave 9. Accordingly, in the present invention, the concept shown in FIG. 1 is used.

The coma wave shown in FIG. 8 has a focal length which decreases toward the outer periphery of the holographic disk 4 in the radial direction. The focal lengths have different directions perpendicular to the radial direction, i.e., perpendicular to the plane of the sheet of the drawing.

The parameters of the spherical optical element 10, which is a convex lens in the illustrated embodiment, are optimized to be substantially the same as the coma wave 9 shown in FIG. 8, as follows (see FIG. 2).

Figure 2:
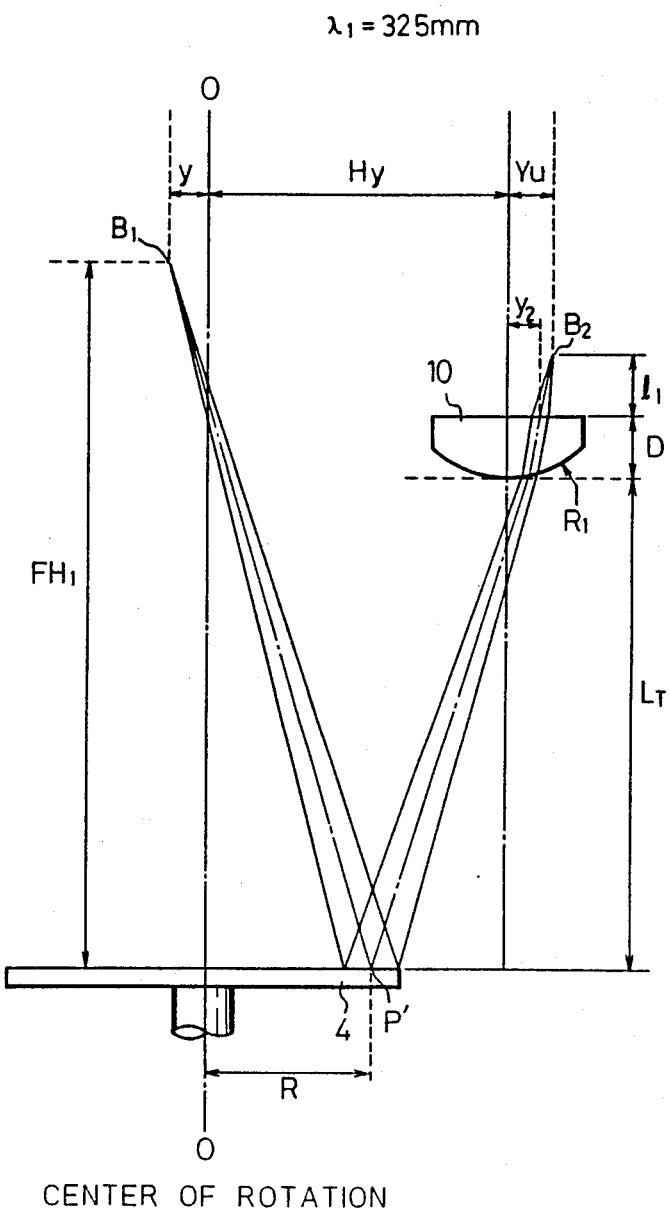
FIG. 2 is a schematic view showing the parameters for the construction of a holographic disk.

In FIG. 2, the incident radius R from the center 0 of rotation of the holographic disk 4 to the incident point P' is 28 mm (R=28 mm), the wavelength $\lambda_1$ of the construction beams is 325 nm ($\lambda_1=325$ nm=wavelength of He-Cd laser), the distance $F_{H1}$ between the point light source $B_1$ and the holographic disk 4 is 115.126 mm ($F_{H1}=115.126$ mm), the distance $y_1$ between the point $B_1$ and the center of rotation of the disk 4 is 5.854 mm ($y_1 = 5.854$ mm), the curvature of radius $R_1$ of the convex lens 10 for producing the aberration is 17.68 mm ($R_1 = 17.68$ mm), the thickness D of the center of the convex lens 10 is 10.00 mm (D=10.00 mm), the material of the convex lens 10 is synthetic quartz, the refractive index N of the convex lens 10 is 1.483 (325 nm), the distance $H_y$ between the optical axis of the convex lens 10 and the center 0 of the disk 4 is 50 mm ($H_r = 50$ mm), the distance $L_r$ of the lower surface of the convex lens 10 and the disk 4 is 80 mm ($L_t=80$ mm), the distance $l_1$ between the point light source $B_2$ of the reference wave and the convex lens 10 is 9.983 mm ($B_2 = 9.983$ mm), the distance $y_n$ between the point $B_2$ and the optical axis of the convex lens 10 is 7.170 mm, and the distance $y_2$ between a point at which the principal axis of the light emitted from the point light source $B_2$ intersects the convex lens 10 and the optical axis of the convex lens 10 is 5.298 mm.

The details of the aberration correcting holographic lens 3 are disclosed in a co-pending Japanese Unexamined Patent Publication No. 62-234118 corresponding to USSN 890,649.

Figure 3:
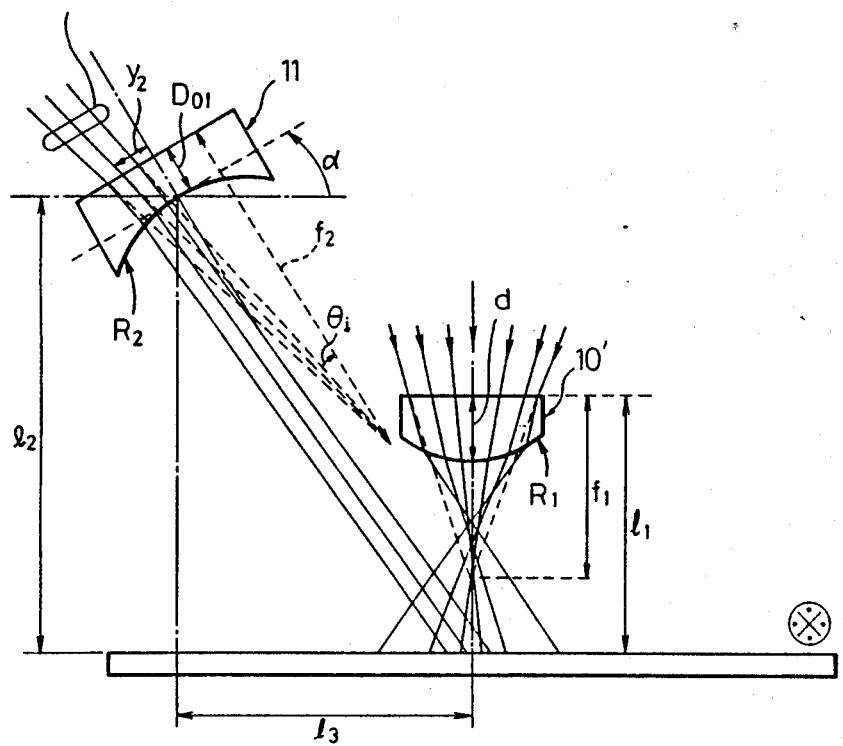
FIG. 3 is a schematic view showing an optical system of an aberration correcting holographic lens, according to the present invention.

In a holographic system having a diode laser 2, the holographic lens 3, and the holographic disk 4 according to the present invention, the optimum design values for constructing the aberration correcting holographic lens 3 are shown in FIG. 3. In FIG. 3, the wavelength $\lambda_1$ of the constructing beam of the holographic lens 3 is 488 nm ($\lambda_1$=488 nm=wavelength of Ar laser), and the parameters of the plane-convex lens 10' are as follows: The thickness d of the center portion of the plane-convex lens 10' is 2.00 mm (d=2.00 mm), the curvature of radius $R_1$ thereof is 15.00 mm (R=15.00 mm), the refractive index is 1.5222 (488 nm, the material is BK-7), the distance $f_1$ between the upper surface of a plane-concave lens 11 upon which a convergent spherical wave is incident and a converging point of the beam thereby is 31.00 mm (f=31.00 mm), and the distance $l_1$ between the upper surface of the lens 10' and the plane of the holographic lens 3 is 41.57 mm ($l_1$=41.57 mm). The material of the plane-concave lens 11 is also BK7. The thickness $D_{01}$ of the center portion of the lens 11 is 20.99 mm and the curvature of radius $R_2$ of the lens 11 is 65.00 mm, the inclination angle $\alpha$ of the lens 11 with respect to the plane of the holographic lens 3 is 18.5°, the distance $l_2$ between the center of the concave surface of the lens 11 and the plane of the holographic lens 3 is 140.00 mm, the distance $l_3$ between the centers of the lenses 10' and 11 is 74.30 mm, and the deviation $y_2$, the focal length $f_2$, and the incident angle $\theta_i$, of the convergent spherical wave 14 from the optical axis are 20.931 mm, 111.593 mm, and 22.23°, respectively.

Figure 4:
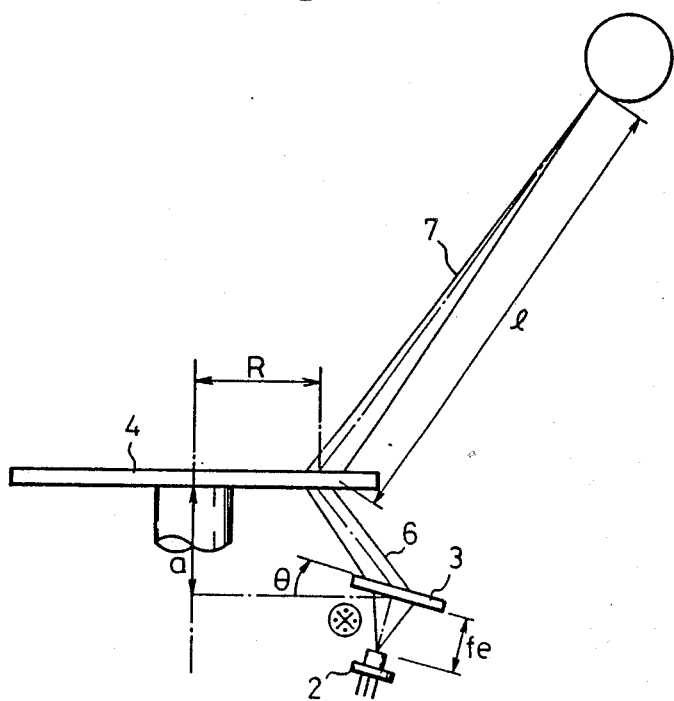
FIG. 4 is a schematic view showing the parameters for the construction of the entire holographic scanner in an embodiment of the present invention.

The holographic lens constructed as above is set, as shown in FIG. 4, in such a way that the distance a between the holographic disk 4 and the holographic lens 3 is 10.0 mm (a=10.0 mm), the inclination angle $\theta$ of the holographic lens 3 is 19.01°, and the distance $f_e$ of the diode laser 2 and the holographic lens 3 is 16.975 mm. In this case, the incident radius R becomes 28 mm. Note that, in FIGS. 3 and 4, the surface of the holographic lens 3 to be set is shown by a mark *. The diode laser 2 has a wavelength of 780 nm. Numerals 6 and 7 in FIG. 4 designate the beams diffracted by the holographic lens 3 and the holographic disk 4, respectively.

Figure 5:
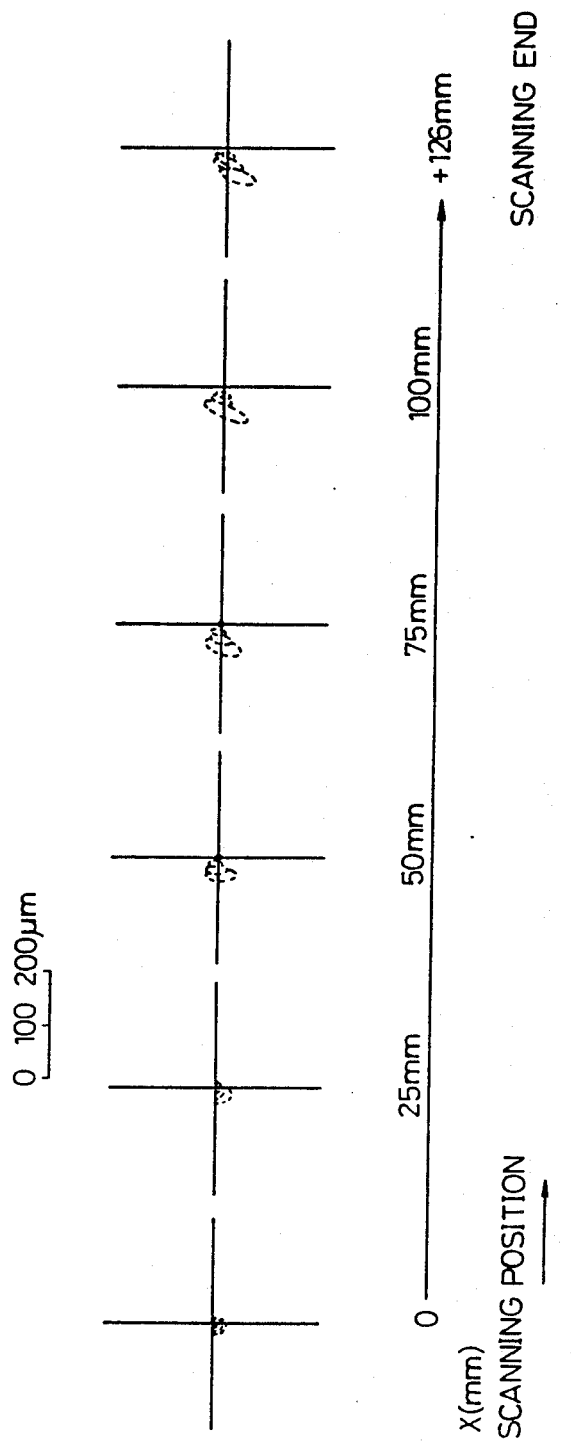
FIG. 5 is a schematic view showing beam spots of scanning beams in an embodiment of the present invention.

FIG. 5 shows a spot diagram of the scanning beams 7 in the total holographic system having the holographic lens 3 and the holographic disk 4. The wavelength $\lambda_2$ of the reconstructing beam of the holographic disk 4 is 780 nm and the incident angle $\theta_i$ is 42.616°. As can be seen from FIG. 5, the aberration of the beam within the scanning width corresponding to 252 mm is within 80 $\mu$m, which is very small. It also can be seen that the spot diagram shown in FIG. 5 is very similar to that shown in FIG. 9, based on the necessary phase transfer function.

Figure 6:
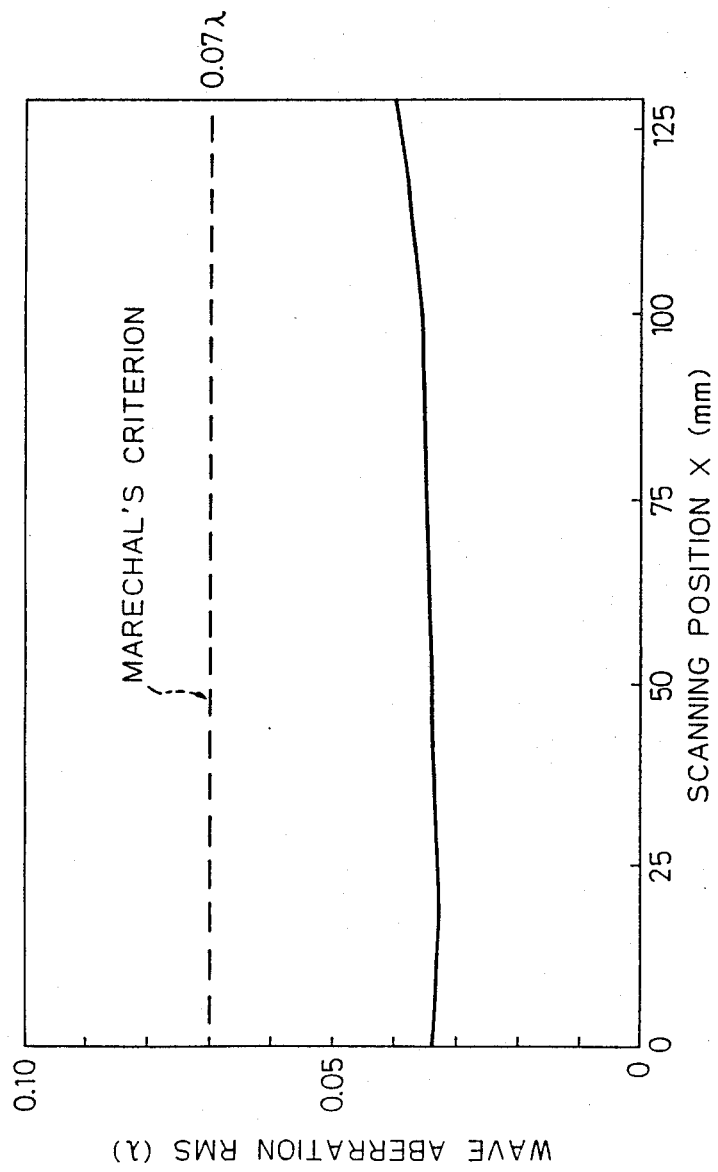
FIG. 6 is a diagram showing an amount of wave aberration in a holographic scanner according to an embodiment of the present invention.

The inventors studied the holographic disk according to the present invention from the viewpoint of wave optics, and obtained the results shown in FIG. 6, in which the diameter of the scanning beam is less than 100 $\mu$m. FIG. 6 shows the calculated RMS ($\lambda$) of the wave aberration of the scanning beam. To provide the resolution limit scanning beam, the RMS must be less than 0.07 $\lambda$ (Marechale's criterion); the RMS according to the present invention is considerably smaller than the Marechale's criterion.

Figure 7:
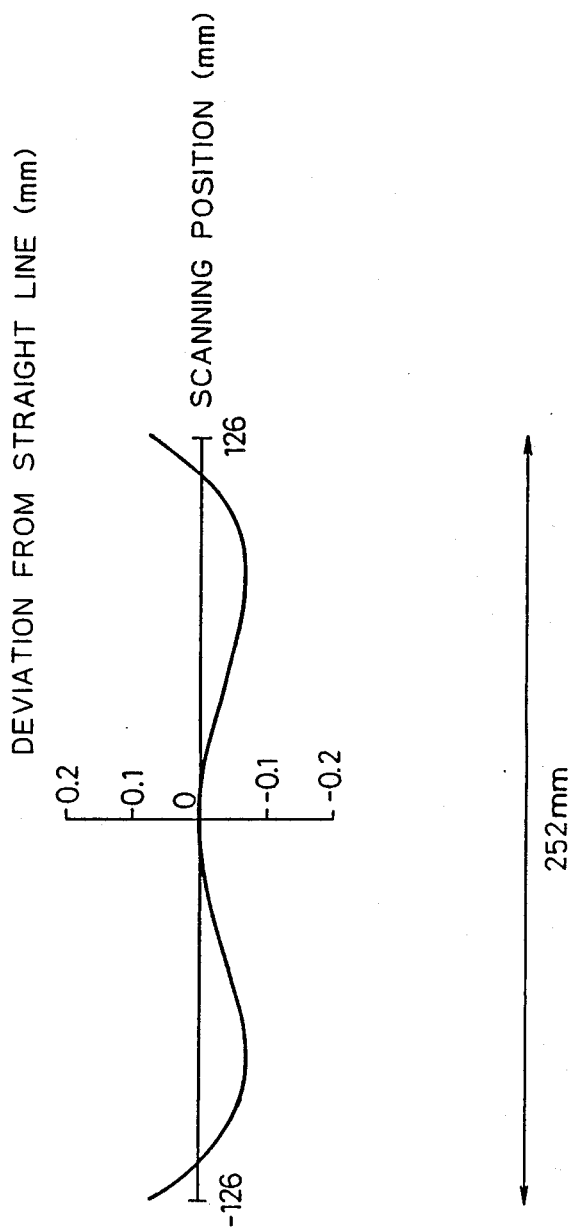
FIG. 7 is a schematic view showing a locus (calculated values) of a beam of light.

FIG. 7 shows the locus of the scanning beam according to FIG. 6. This locus is also very similar to that in the necessary phase transfer function $\psi_H$, as shown in FIG. 10 mentioned above.

As can be seen from the above description, the holographic disk according to the present invention can be considered to be almost ideal from the viewpoint of resolving power and straight line scanning.

Namely, according to the present invention, a very small and high precision straight line beam scanning device having a high resolving power can be provided.

It is possible to use a convex lens 10 for the reference wave as shown in FIG. 13, and convex lenses 10 for both the reference wave and the object wave as shown in FIG. 14.

It should be appreciated that, if the reference wave for constructing the holographic disk is a vertical parallel wave, the reconstructing wave is incident upon the holographic disk at an incident angle perpendicular to the plane thereof.

The improvement of the present invention is also directed to the prevention of an undesirable displacement (fluctuation) of the scanning beam due to disk wobble occurring about the center of rotation of the holographic disk.

Figure 15:
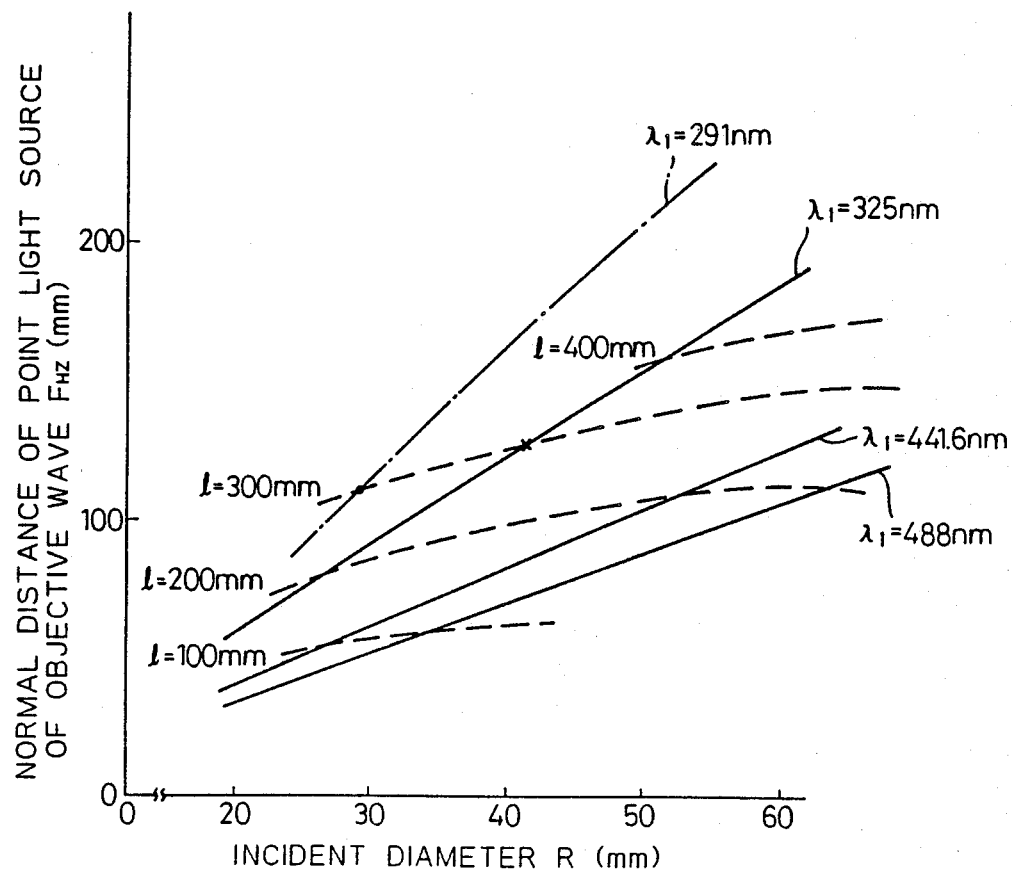
FIG. 15 is a diagram explaining the parameters for the design of a holographic disk in a known holographic beam scanner.

The above-mentioned Japanese Unexamined Patent Publication No. 60-194419, in which the incident angle $\theta_i$ and the emitting angle (diffraction angle $\theta_d$ are identical to each other, contributes to the prevention of disk wobble occurring about the incident point of the reconstruction beam, as shown in FIG. 15, wherein the disk 4 wobbling about the incident point of the reconstruction beam is designated 4'. Nevertheless, it has been found that the arrangement disclosed in Japanese Unexamined Patent Publication No. 60-194419 is not effective with regard to an undesirable displacement of the scanning beam due to the disk wobble occurring about the center of rotation of the holographic disk.

The inventors of the present invention considered that such an undesirable displacement of the scanning beam due to disk wobble can be effectively prevented by a slight alternation of the equality of the incident angle and the emitting angle, as described below.

Figure 11:
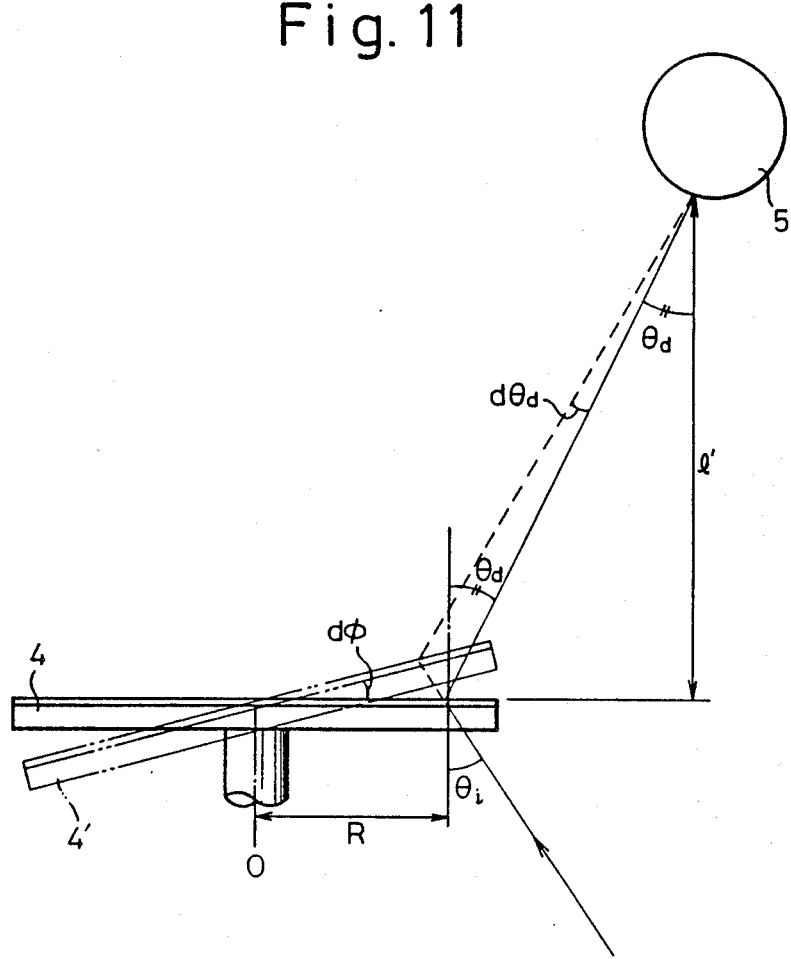
FIG. 11 is a schematic view of an embodiment in which disk wobble is prevented.

In FIG. 11, assuming that the distance between the focal point of the scanning beam diffracted by the holographic disk 4 on the photoconductive drum 5 and the plane of holographic disk 4 is l', the incident angle is $\theta_i$, the emitting angle (diffraction angle by the hologram) is $\theta_d$, and the disk wobble angle with respect to the center of rotation thereof is d$\phi$, the deviation d$\theta_d$ of the diffraction angle due to the disk wobble about the center of rotation thereof can be obtained by the following linear approximation:

$$d\theta_d = [\cos\theta_i / \cos\theta_d - 1]d\phi \tag{4}$$

On the other hand, if the deviation of the diffraction angle d$\theta_d$ satisfies the following equation, the displacement of the scanning beam can be prevented:

$$R \cdot d\phi = (l'/\cos\theta_d) \cdot d\theta_d$$

wherein R is an incident radius (see, e.g., FIG. 4)

$$d\theta_d = [R/(l'/\cos\theta_d)] \cdot d\phi \tag{5}$$

The following equation was obtained from the equations (4) and (5).

$$(R/l') \cdot \cos\theta_d = (\cos\theta_i / \cos\theta_d) - 1 \tag{6}$$

And from equation (6), the following equation (7) can be obtained.

$$(R/l)\cos^2\theta_d = (\cos\theta_i - \cos\theta_d) \quad (7)$$

It is not known whether or not a holographic disk 4 which can perform a straight line scanning, and which satisfies the equation (7), exists.

The following proves the possibility of obtaining such a disk 4.

It is assumed that the incident angle $\theta_i$ satisfies the following equation (see FIG. 4)

$$\sin\theta_i = S \cdot \frac{R}{\sqrt{F_1^2 + R^2}} \quad (8)$$

wherein $S = \lambda_2/\lambda_1$ ($\lambda_1$ = wavelength of the constructing wave, $\lambda_2$ = wavelength of the reconstructing wave); $F_1$ = vertical distance between the point light source $A_1$ of the reference wave and the plane of the disk 4; and R = incident radius of the reconstruction point P;

Generally speaking, the incident angle condition (8) mentioned above is a Bragg angle at which the diffraction efficiency is highest, but is not limited thereto.

Accordingly, $\cos\theta_i$ and $\cos\theta_d$ are given by the following equations (9) and (10), respectively.

$$\cos\theta_i = \left[\frac{(1-S^2)R^2 + F_1^2}{F_1^2 + R^2}\right]^{1/2} \quad (9)$$

$$\cos\theta_4 = \left[\frac{(1-S^2)(R-Y_2)^2 + F_2^2}{F_2^2 + (R-Y_2)^2}\right]^{1/2} \quad (10)$$

wherein $F_2$ = vertical distance between the point light source $A_2$ and the plane of the disk 4; and $y_2$ vertical distance between the points $A_1$ and $A_2$.

It will be easily understood that, in equations (9) and (10), the arrangement is obtained in which $Y_2 = 2R$ and $F_1 = F_2$ corresponds to the symmetrical arrangement shown in FIG. 14, in which the point $A_1$ is symmetrical to the point $A_2$ with respect to the plane normal to the plane of the holographic disk at the reconstruction point. In this case, $O_i = \theta_d$.

Figure 16:
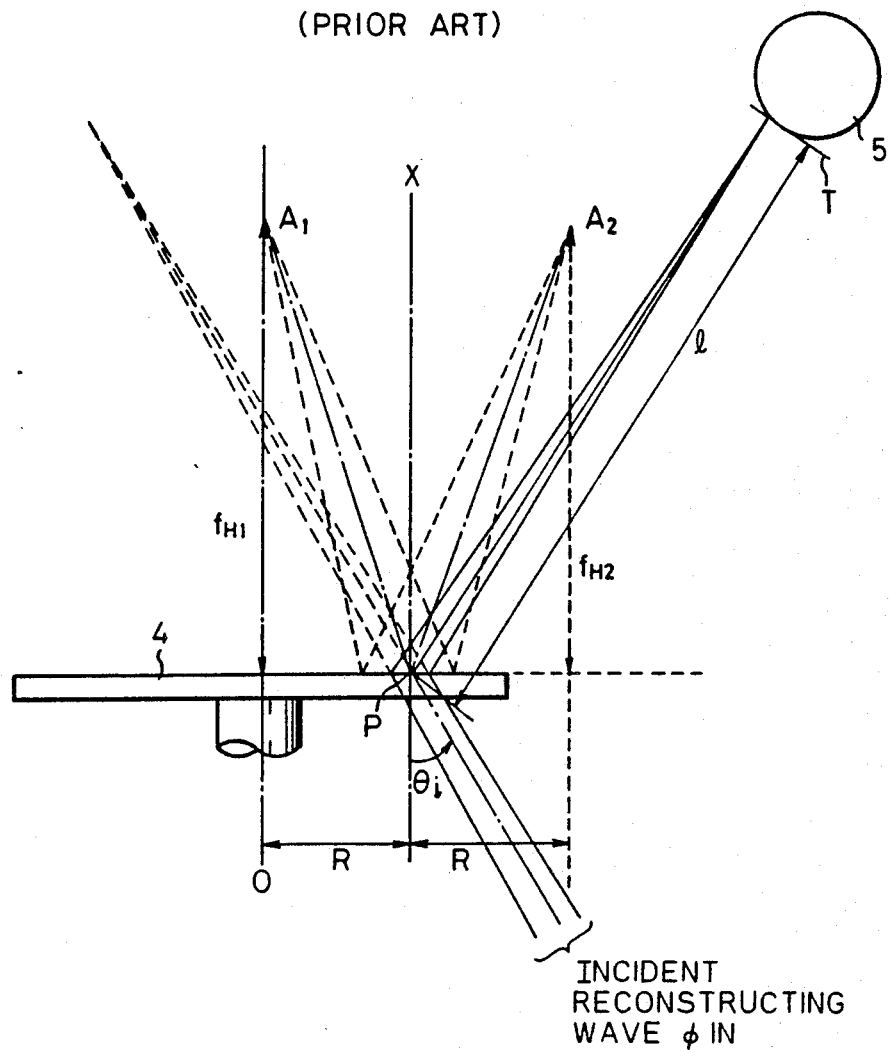
FIG. 16 is a schematic view showing the manner of constructing a holographic disk according to the prior art.
Figure 17:
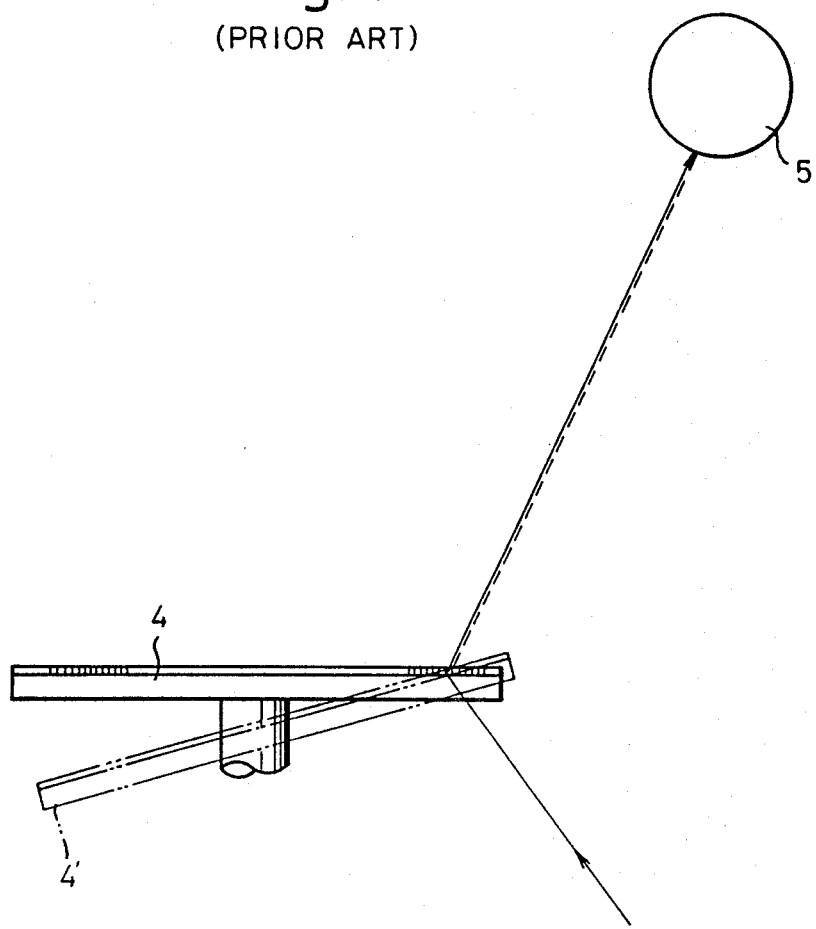
FIG. 17 is a schematic view showing disk wobble in a prior art.

It is well known that the condition for performing a straight line scanning on the scanning plane (imaging plane) T (FIG. 16) is given by the following equation.

$$F_2 = \sqrt{(S^2-1)Y_2(Y_2-R)} \quad (11)$$

The condition giving the largest margin (allowance of deviation from the axis) of the holographic disk is represented by the following equation.

$$F_2^2[F_1^2+R^2]^{3/2} = F_1^2[F^2+(R-Y_2)^2]^{3/2} \quad (12)$$

The deviation of equation (12) is disclosed in the above-mentioned Japanese Unexamined Patent Publication No. 60-194419.

In the actual design of the holographic disk, the incident angle R, the ratio S of wavelength, and the length l are first determined, and the remaining parameters, $F_1$, $F_2$, $Y_2$ then determined by the three simultaneous equations (7), (11) and (12).

The following is an example of suitable compact holographic design values.

$\lambda_2$: 780 nm (diode laser),
$\lambda_1$: 291 nm (virtual wavelength),
$F_1$: 107.339 nm,
$F_2$: 105.198 nm,
R = 28 mm,
$Y_2$ = 58.214 mm,
$\theta_i$ = 42.616°,
$\theta_d$ = 47.774°,
l = 276 mm.

It has been found that the deviation of the scanning beam from the straight line is within ±0.1 mm in a scanning width of 252 mm.

It also has been confirmed that, assuming that the allowable position displacement of the repeated scanning beams is 20 μm, the disk wobble must be kept within 30" in the conventional symmetrical arrangement of the point light sources $A_1$ and $A_2$, but can be within 60" in the present invention, to thus ensure the allowable position displacement. This is why a difference between the incident angle and the diffraction angle exists in the previously mentioned scanner design. The first term in equation (2) used this design value.

We claim:

1. A light beam scanning apparatus comprising: a rotatable holographic disk having a hologram for diffracting beams and being constructed by an interference of construction waves including a reference wave and an objective wave, at least one of the construction waves being a coma wave, said coma wave having a focal length which decreases toward the outer periphery from the inner periphery of the holographic disk in a radial direction, said focal length having a different direction perpendicular to the radial direction, so that when the hologram of the holographic disk, which rotates, is reconstructed by a reconstruction wave scanning is effected by the beams diffracted by the hologram.

2. A light beam scanning apparatus according to claim 1, wherein said objective wave is a coma wave which is produced when a non-aberration spherical wave incident upon a spherical optical element is axially offset.

3. A light beam scanning apparatus according to claim 2, wherein said spherical optical element is a convex lens.

4. A light beam scanning apparatus according to claim 3, wherein said reference wave is divergent spherical wave having no aberration.

5. A light beam scanning apparatus according to claim 3, wherein said reference wave is emitted from a point light source located opposite to a point light source of the objective wave with respect to an axis of the rotatable holographic disk.

6. A light beam scanning apparatus according to claim 5, wherein a normal distance between the point light source of the object wave and the holographic disk is given by the following equation:

$$F_2 = \sqrt{(S^2-1)Y_2(Y_2-R)}$$

wherein
$Y_2$ is a distance between the point light sources of the reference wave and the objective wave.

7. A light beam scanning apparatus according to claim 1, wherein said reference wave is a coma wave which is produced when a non-aberration spherical wave incident upon a spherical optical element is axially offset.

8. A light beam scanning apparatus according to claim 7, wherein said spherical optical element is a convex lens.

9. A light beam scanning apparatus according to claim 1, wherein the wavelength of the construction waves of the hologram is shorter than that of the reconstruction wave.

10. A light beam scanning apparatus according to claim 1, wherein both the reference wave and the objective wave are divergent spherical waves emitted from point light sources and wherein the reconstruction wave is incident upon the holographic disk at a reconstruction point at an incident angle $\theta_i$ given by the following equation:

$$R/l \cdot \cos \theta_d = \cos \theta_i - \cos \theta_d \ldots$$

$$\sin \theta_i = S \cdot R / \sqrt{(F_1^2 + R^2)}$$

wherein
- R is a distance between the axis of rotation of the holographic disk and the reconstruction point;
- l is a focal length of the hologram;
- $\theta_i$ is a incident angle of the reconstruction wave;
- $\theta_d$ is a diffraction angle of the reconstruction wave by the hologram;
- S is a ratio between the wavelength ($\lambda_1$) of the construction wave and the wavelength ($\lambda_2$) of the construction wave ($S = \lambda_2/\lambda_1$);
- $F_1$ is a normal distance between the point light source of the reference wave and the holographic disk.

11. A light beam scanning apparatus comprising:
a rotatable holographic disk having a hologram for diffracting beams and being constructed by an interference of a reference wave and an objective wave wherein both the reference wave and the objective wave are divergent spherical waves emitted from point light sources and wherein the reconstruction wave is incident upon the holographic disk at a reconstruction point at an incident angle $\theta_i$ given by the following equation:

$$R/l \cos \theta_d = \cos \theta_i - \cos \theta_d \ldots$$

$$\sin \theta_i = S \cdot R / \sqrt{(F_1^2 + R^2)}$$

wherein
- R is a distance between the axis of rotation of the holographic disk and the reconstruction point;
- l is a focal length of the hologram;
- $\theta_i$ is an incident angle of the reconstruction wave;
- $\theta_d$ is a diffraction angle of the reconstruction wave by the hologram;
- S is a ratio between the wavelength ($\lambda_1$) of the construction wave and the wavelength ($\lambda_2$) of the construction wave ($S = \lambda_2/\lambda_1$);
- $F_1$ is a normal distance between the point light source of the reference wave and the holographic disk.

* * * * *

UNITED STATES PATENT AND TRADEMARK OFFICE
CERTIFICATE OF CORRECTION

PATENT NO. : 4,948,213

DATED : 8-14-90

INVENTOR(S) : Hasegawa et al.

It is certified that error appears in the above-identified patent and that said Letters Patent is hereby corrected as shown below:

Col. 2, in the equation, change "$f^2H1$" to -- $f_{H1}^2$ --.

Col. 5, in the equation, change "$f^2H1$" to -- $f_{H1}^2$ --.
line 33, change "$\pi_1'$" to -- $\lambda_1'$ --;
line 34, change "$\pi_1'$" to -- $\lambda_1'$ --;
in equation 3, change "$\gamma_{in}^{opt}$" to -- $\gamma_{in}^{opt}$ --.

Col. 8, line 26, change "angle" to --angle)--.

Col. 12, in the equation, change "R/1 cos" to --R/1·cos--.

Signed and Sealed this

Fifth Day of November, 1991

Attest:

HARRY F. MANBECK, JR.

*Attesting Officer*  *Commissioner of Patents and Trademarks*